United States Patent [19]

Mukozaka

[11] Patent Number: 4,905,312

[45] Date of Patent: Feb. 27, 1990

[54] IMAGE LOGIC OPERATION DEVICE

[75] Inventor: Naohisa Mukozaka, Shizuoka, Japan

[73] Assignee: Hamamatsu Photonics Kabushiki Kaisha, Shizuoka, Japan

[21] Appl. No.: 380,756

[22] Filed: Jul. 17, 1989

Related U.S. Application Data

[63] Continuation of Ser. No. 71,140, Jul. 8, 1987, abandoned.

[30] Foreign Application Priority Data

Jul. 11, 1986 [JP] Japan ................................ 61-162980

[51] Int. Cl.[4] ................................................ G06F 7/56

[52] U.S. Cl. ............................ 250/213 VT; 250/225; 350/342; 350/374; 364/713

[58] Field of Search ........................ 250/213 VT, 225; 350/335, 342, 374, 403; 364/713, 822; 365/108, 109, 215, 112

[56] References Cited

U.S. PATENT DOCUMENTS 2,936,380 5/1960 Anderson ............................ 364/713

3,903,400 9/1975 Nisenson ............................ 364/713

4,103,260 7/1978 Buchman ............................ 350/403

4,351,589 9/1982 Chavel et al. ........................ 350/342

4,481,531 11/1984 Wardle et al. ...................... 350/342

*Primary Examiner*—Edward P. Westin

*Attorney, Agent, or Firm*—Finnegan, Henderson, Farabow, Garrett and Dunner

[57] ABSTRACT

An image logic operation device for performing logic operations on images, the device comprising a first image unit for storing a first light image and sending out the light image or the reverse thereof by a reading-out light, and a second image unit for storing a second light image and sending out the light image or the reverse thereof by a reading-out light. The reading-out light from the first image unit is passed through an analyzer and then used to read out the image from the second image unit, whereby AND operation on the images is thus performed. The image logic operation device according to this invention also performed other logic operations such as NAND, OR, NOR, XOR, XNOR and so on.

4 Claims, 2 Drawing Sheets

IMAGE LOGIC OPERATION DEVICE

This application is a continuation of application Ser. No. 071,140 filed Jul. 8, 1987, abandoned.

BACKGROUND OF THE INVENTION

1. Field of the Invention

The present invention relates to an image logic operation device, more particularly, to an image logic operation device using a spatial light modulator for performing a logic operation on images.

2. Background of the Prior Art

A logic operation on images can be performed by using an art of image processing with an electronic computer. To perform the logic operation, a television camera means, a frame memory for storing image information in terms of image elements, a frame memory for storing the result of the logic operation, and an operation circuit for performing the logic operation are usually needed.

The process of such logic operation includes a large number of series processing and, therefore, has a disadvantage in that a device for the logic operation increases in size as the number of image element increases.

SUMMARY OF THE INVENTION

It is an object of the present invention to provide an image logic operation device capable of performing logic operation on images through the use of image units such as Microchannel Spatial Light Modulators (MSLM).

This object can be achieved by an image logic operation device according to this invention which comprises a first image unit for storing a first light image and sending out the image or the reverse thereof by reading-out light, and a second image unit for storing a second light image and sending out the image or the reverse thereof by the reading-out light. The reading-out light from the first image unit is passed through an analyzer and then used to read out the image from the second image unit. An AND operation on the images is thus performed.

Since the image units are made of the Microchannel Spatial Light Modulators or the like, the characteristics of the units can be utilized to perform the logic operation using fewer steps than a conventional method. For that reason, the image logic operation device is very useful in computation based on light.

DETAILED DESCRIPTION OF THE INVENTION

An embodiment of the present invention will be hereafter described in detail with reference to the accompanying drawings.

Figure 1:
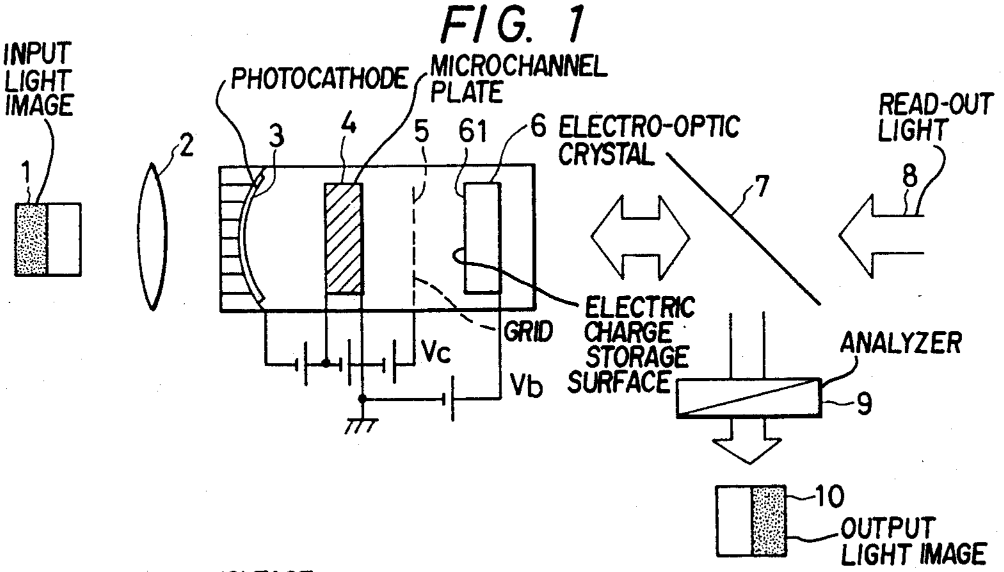
FIG. 1 shows a schematic view for explaining the basic constitution and operation of a Microchannel Spatial Light Modulator, which is a basic component of the image logic operation device.

FIG. 1 shows a schematic view for explaining the basic constitution and operation of a Microchannel Spatial Light Modulator which is a basic component of an image logic operation device.

The incoherent input light image 1 transmitted to the photocathode 3 of the Microchannel Spatial Light Modulator by a lens 2 is converted into a photoelectron image, the photoelectrons of which are drawn to a microchannel plate 4 by an applied voltage of a DC source and are multiplied thereby. The photoelectrons thus multiplied are drawn through a grid 5 to an electro-optic crystal 6, such as $LiNbO_3$ or the like, to make an electric charge pattern on the surface 61 of electro-optic crystal 6. An electric field extending across the electro-optic crystal 6 is changed depending on the electric charge pattern so that the refractive index of the electro-optic crystal 6 is altered by the Pockels effect. Linearly polarized laser light 8 from a laser source (not shown) is irradiated upon the electro-optic crystal 6. The polarized state of the light 8 reflected from the electric charge storage surface 61 of the electro-optic crystal 6 differs from that of the light 8 about to be irradiated upon the electro-optic crystal owing to the change of the refractive index of the electric charge storage surface 61. For that reason, a coherent light output 10 having the information of the input incoherent light from the light image 1 can be obtained by passing the reflected laser light 8 via half mirror 7 through an analyzer 9.

I. Storage function

Two major functions of the Microchannel Spatial Light Modulator, which are essential to the present invention, are described below.

The Microchannel Spatial Light Modulator has a storage function to maintain the distribution of electric charge on the surface of an electro-optic crystal for a long period of time.

Since the surface 61 of the electro-optic crystal 6 has a very high electric resistance, electric charge imparted to the surface can be stored for a long time (several days or more).

II. Reversed image forming function

Figure 3:
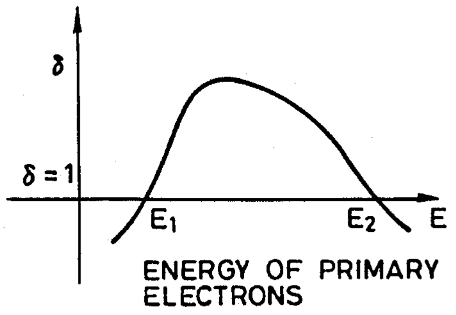
FIG. 3 shows a graph indicating the secondary electron emission characteristic of an electro-optic crystal.

When the energy of primary electrons entering into the electro-optic crystal 6 is lower than a first crossover point $E_1$ (shown in FIG. 3) or higher than a second crossover point $E_2$, the number of the primary electrons is larger than that of secondary electrons emitting from the electro-optic crystal 6 ($\delta<1$), so that the surface of the electro-optic crystal 6 is negatively charged, where $\delta$ represents the ratio of the number of the secondary electrons to that of the primary electrons.

When the energy of the primary electrons entering into the electro-optic crystal 6 is between the first and the second crossover points $E_1$ and $E_2$, the number of the secondary electrons is larger than that of the primary electrons ($\delta>1$), so that the surface of the crystal is positively charged. Either a positive or a negative (reversed) light image corresponding to an incoherent light image can be formed on the electro-optic crystal by positively or negatively charging the electro-optic crystal.

The positive or negative charging (writing) is achieved by controlling voltages Vc and Vb shown in FIG. 1.

Figure 2:
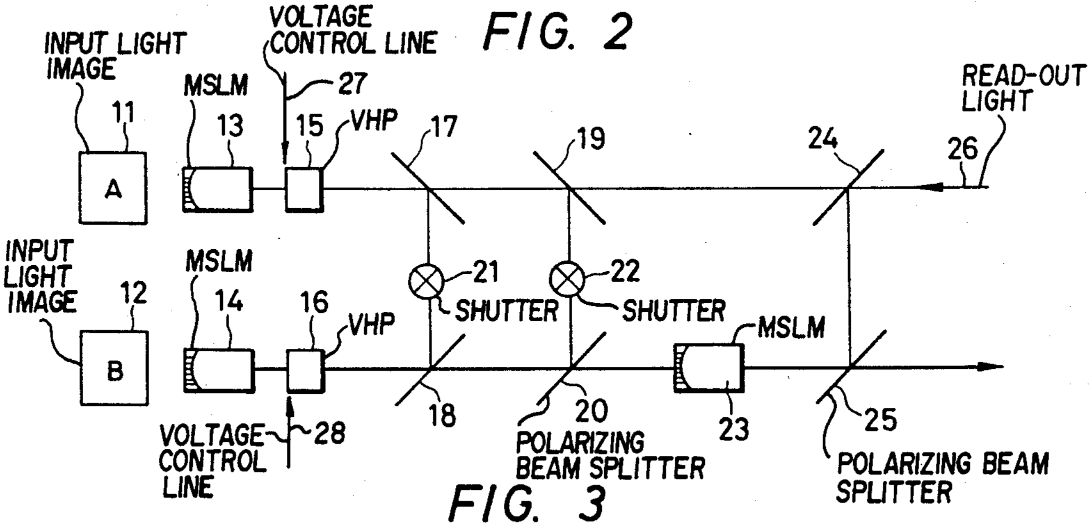
FIG. 2 shows a block diagram of an image logic operation device, which is an embodiment of the present invention.

FIG. 2 shows a schematic view of the image logic operation device. A first image 11 (input light image A) is written into a first Microchannel Spatial Light Modulator (MSLM) 13 and stored therein. A second image 12 (input light image B) is written into a second Microchannel Spatial Light Modulator (MSLM) 14 and stored therein. Laser light 26 for reading-out is supplied from a laser source not shown in the drawings.

An AND operation or XOR (exclusive OR) operation is performed by reading out stored information from the first Microchannel Spatial Light Modulator 13 and then from the second Microchannel Spatial Light Modulator (MSLM) 14. The result of the operation is written as an unreversed or reversed image into a Microchannel Spatial Light Modulator (MSLM) 23. The written image is read out from the Microchannel Spatial Light Modulator 23 by reading-out light 26 to obtain an output.

A reversed light image of an incoherent light can be obtained by a method other than the above-described charging operation where a sign of charges on the electro-optic crystal is changed. For example, voltage-controlled half-wave plates perform reversal reading-out. In this case, the voltage-controlled half-wave plates (VHP) 15 and 16 are provided on the output sides of the first and the second Microchannel Spatial Light Modulators (MSLM) 13 and 14, respectively. The optical phase difference between two linearly polarized light components perpendicular to each other is equalized to Π radians (180 degrees) by applying a voltage to each of the voltage-controlled half-wave plates 15 and 16 via voltage control lines 27 and 28, respectively. The plates 15 and 16 are used to perform reversal reading-out.

Half mirrors 17, 18, 19 and 24 and polarizing beam splitters 20 and 25 are provided. The splitters 20 and 25 are beam splitters through which pass a component parallel to an incidence surface and reflect the other components perpendicular to the incidence surface.

Shutters 21 and 22 are used to select paths.

Figure 4:
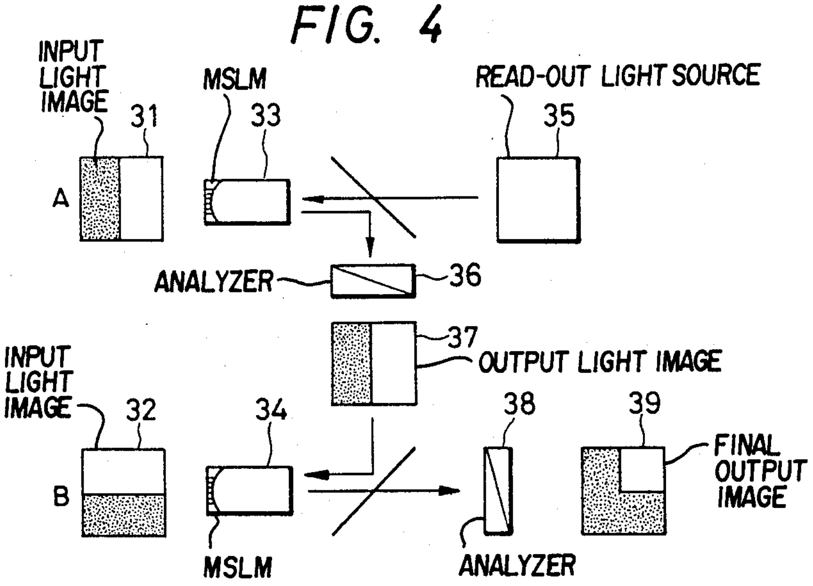
FIG. 4 shows a diagrammatic view explaining an AND operation of the present invention.

An AND operation method which is a feature of the present invention is described below. As shown in FIG. 4, a first image 31 is read out from a Microchannel Spatial Light Modulator (MSLM) 33 by reading-out light 35 and then subjected to intensity conversion by an analyzer 36 so that an output 37 is obtained. The output 37 is used as reading-out light to read out a second image 32 from another Microchannel Spatial Light Modulator (MSLM) 34. The read-out second image 32 is subjected to intensity conversion by an analyzer 38 so that an output 39 is obtained. Since the output 39 results from the superposition of the high-luminance portions (white portions in the drawings) of the first and the second images, the above-described operation is an AND operation.

Figure 5:
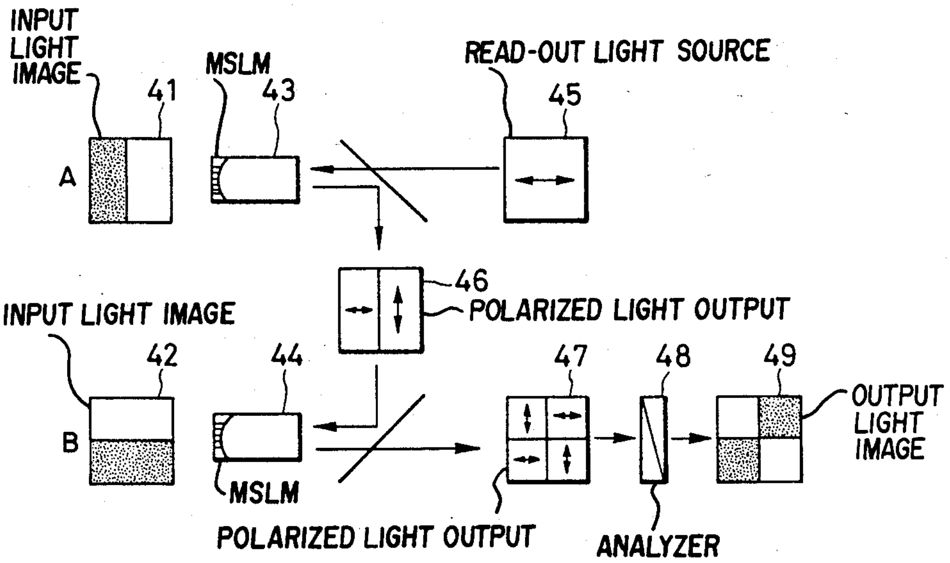
FIG. 5 shows a diagrammatic view explaining an XOR (exclusive OR) operation of the present invention.

As shown in FIG. 5, a first image 41 is read out from a Microchannel Spatial Light Modulator (MSLM) 43 by reading-out light 45 so that a polarized light output 46 is obtained. The output 46 is used as reading-out light to read out a second image 42 from another Microchannel Spatial Light Modulator 44 to obtain a polarized light output 47. The output 47 is subjected to intensity conversion by an analyzer 48 so that an output 49 is obtained. The output 49 results from an XOR (exclusive OR) operation on the first and the second images 41 and 42.

Logic operation methods according to the present invention are collectively described below with reference to FIG. 2

(1) AND operation

Only the shutter 22 is opened to read out stored information from the Microchannel Spatial Light Modulator 13. The read-out information is analyzed by the polarizing beam splitter 20 so that reading-out light having intensity information is obtained. The reading-out light is used to read out stored information from the Microchannel Spatial Light Modulator 14. The information read out from the tube 14 is analyzed by the polarizing beam splitter 20 so that the information is written as an unreversed image into the Microchannel Spatial Light Modulator 23. The written information is read out by the reading-out light and then analyzed by the polarizing beam splitter 25 so that an AND operation output is obtained.

(2) NAND operation

The information read out from the Microchannel Spatial Light Modulator 14 and analyzed by the polarizing beam splitter 20 in the above-described AND operation is written as a reversed image into the Microchannel Spatial Light Modulator 23 and then read out so that a NAND operation output is obtained.

(3) $\overline{A}\cdot B$ operation $\overline{A}\cdot B$ operation is performed by executing the above-described AND operation while the voltage is applied to the voltage-controlled half-wave plate 15. The plate 15 consists of the same material and structure as the electro-optic crystal 6 but has a transparent electrode for applying voltage. The plate 15 has the same properties as a half-wave plate only when the voltage is applied to the plate 15. The symbol $\overline{A}$ denotes the negative (NOT) of A.

(4) $A\cdot\overline{B}$ operation $A\cdot\overline{B}$ operation is performed by executing the above-described AND operation while the voltage is applied to the voltage-controlled half-wave plate 16.

(5) OR operation

OR operation is performed by executing the above-described NAND operation while the voltage is applied to the voltage-controlled half-wave plates 15 and 16.

(6) NOR operation

NOR operation is performed by executing the above-described AND operation while the voltage is applied to the voltage-controlled half-wave plates 15 and 16.

(7) $\overline{A}+B$ operation $\overline{A}+B$ operation is performed by writing information as a reversed image into the Microchannel Spatial Light Modulator 23 and then reading out the information in the above-described $A\cdot\overline{B}$ operation.

(8) $A+\overline{B}$ operation $A+\overline{B}$ operation is performed by writing information as a reversed image into the Microchannel Spatial Light Modulator 23 and then reading out the information in the above-described $\overline{A}\cdot B$ operation.

(9) XOR (exclusive OR) operation

Information stored in the Microchannel Spatial Light Modulator 13 is read out by opening the shutter 21 and is not converted into intensity information. Information stored in the other Microchannel Spatial Light Modulator 14 is subsequently read out and then converted into intensity information by the polarizing beam splitter 20. The intensity information is written as a reversed image into the Microchannel Spatial Light Modulator 23 and then read out to obtain an XOR operation output.

(10) XNOR (exclusive NOR) operation

XNOR operation is performed by writing the intensity information as an unreversed image into the Microchannel Spatial Light Modulator 23 and then reading out the information in the above-described XOR operation.

As described above, a device according to this invention can perform logic operation with fewer process steps and therefore is more useful in optical computing system than other conventional devices.

What is claimed is:

1. An image logic operation device for performing logic operations on images, comprising:

a first microchannel spatial light modulator, including a first voltage-controlled electro-optic crystal, for storing a first light image and sending out said first light image by a first reading-out light, wherein the first light image is reversed when a voltage is applied to said first voltage-controlled electro-optic crystal;

a second microchannel spatial light modulator, including a second voltage-controlled electro-optic crystal, for storing a second light image and sending out said second light image by a second reading-out light, wherein the second light image is reversed when a voltage is applied to said second voltage-controlled electro-optic crystal; and an analyzer for passing therethrough said first light image, wherein the output of the analyzer is provided as said second reading-out light to said second microchannel spatial light modulator, thereby performing an AND operation on said first and second light images.

2. An image logic operation device as claimed in claim 1, wherein said first reading-out light includes a coherent light.

3. An image logic operation device for performing logic operations on images, comprising:

a first microchannel spatial light modulator, including a first voltage-controlled electro-optic crystal, for storing a first light image and sending out said first light image by a first reading-out light, wherein the first light image is reversed when a voltage is applied to said first voltage-controlled electro-optic crystal;

a second microchannel spatial light modulator, including a second voltage-controlled electro-optical crystal, for storing a second light image and sending out said second light image by a second reading-out light, wherein the second light image is reversed when a voltage is applied to said second voltage-controlled electro-optic crystal;

an analyzer for passing therethrough said first light image, wherein the output of the analyzer is provided as said second reading-out light to said second microchannel spatial light modulator, thereby performing an AND operation on said first and second light images; and a voltage-controlling means connected to said first and second microchannel spatial light modulators for optically reversing said first light image by changing a sign of charges on said first voltage-controlled electro-optical crystal and for optically reversing said second light image by changing a sign of charges on said second voltage-controlled electro-optic crystal.

4. An image logic operation device as claimed in claim 3, wherein said said first reading-out light includes a coherent light.

* * * * *